United States Patent [19]

Baur

[11] Patent Number: 5,217,345
[45] Date of Patent: Jun. 8, 1993

[54] METHOD FOR TRANSPORTING COMPUTER DATA STORAGE CASSETTES BETWEEN A CASSETTE LIBRARY AND CASSETTE DRIVE

[75] Inventor: Rolf Baur, Heubach-Lautern, Fed. Rep. of Germany

[73] Assignee: Grau GmbH & Co., Fed. Rep. of Germany

[21] Appl. No.: 662,945

[22] Filed: Mar. 1, 1991

Related U.S. Application Data

[60] Division of Ser. No. 391,284, Aug. 9, 1989, Pat. No. 5,015,139, which is a continuation-in-part of Ser. No. 182,593, Apr. 18, 1988, abandoned, and a continuation-in-part of Ser. No. 182,702, Apr. 18, 1988, abandoned.

[30] Foreign Application Priority Data

Jan. 20, 1988 [DE] Fed. Rep. of Germany ....... 3801397

[51] Int. Cl.$^5$ .............................. B65G 1/00
[52] U.S. Cl. ................................... 414/786
[58] Field of Search ............... 414/786, 277, 279–283; 360/69, 92; 369/34

[56] References Cited

U.S. PATENT DOCUMENTS

| 3,233,750 | 2/1966  | Bannon . |
| 3,262,593 | 7/1966  | Hainer . |
| 3,802,580 | 4/1974  | Castaldi . |
| 3,822,025 | 7/1974  | Loos ................................... 414/280 |
| 3,831,197 | 8/1974  | Beach et al. ......................... 360/71 |
| 3,848,753 | 11/1974 | Borg et al. . |
| 3,920,195 | 11/1975 | Sills et al. . |
| 3,938,190 | 2/1976  | Semmlow et al. ................... 360/72 |
| 4,271,440 | 6/1981  | Jenkins et al. ...................... 360/92 |
| 4,428,710 | 1/1984  | Grisebach et al. ................. 414/590 |
| 4,621,711 | 11/1986 | Miyashige et al. ................. 187/9 E |
| 4,626,160 | 12/1986 | Shiomi et al. ...................... 414/222 |
| 4,644,425 | 2/1987  | Tamaki ................................ 360/69 |
| 4,653,794 | 3/1987  | Atlas . |
| 4,655,674 | 4/1987  | Kohler et al. ....................... 414/735 |
| 4,674,181 | 6/1987  | Hamada et al. ...................... 29/703 |

(List continued on next page.)

FOREIGN PATENT DOCUMENTS

| 0162248 | 11/1985 | European Pat. Off. . |
| 0276967 | 8/1988  | European Pat. Off. . |
| 1431675 | 9/1961  | Fed. Rep. of Germany . |
| 2047386 | 4/1971  | Fed. Rep. of Germany . |

(List continued on next page.)

OTHER PUBLICATIONS

Patent Abstract of JP-133726.

SMPTE Journal, Apr. 1979, vol. 88, No. 4, pp. 221–223. Articles re "A New Level of Automation in Work-in-Process Handling".

Bosch Catalogue entitled "Flexible Automation and Handling Technology", dated Aug. 1986.

(List continued on next page.)

Primary Examiner—David A. Bucci
Attorney, Agent, or Firm—Nixon & Vanderhye

[57] ABSTRACT

A system especially adapted to retrieve, insert and transport a computer data storage cassette between spaced-apart cassette library and cassette drive unit sites. The system includes a robot carried by a movable transport assembly which is operable to transport the robot between the cassette library and cassette drive unit sites. The robot itself includes an especially adapted robotic manipulator whereby the cassette may be gripped and released. A mechanical cassette ejector is preferably provided to ensure that the cassette is expelled from the fingers of the robotic manipulator when the cassette is released. A push rod may also be provided so as to engage, and thus manipulate, a door which covers a slot of the cassette drive unit. Controlled movements of the transport system will bring the robotic manipulator into an initial position relative to the cassette in the cassette library or the cassette drive unit, such that controlled movements of the robot will then effect precise positioning of the manipulator relative to the cassette.

27 Claims, 11 Drawing Sheets

U.S. PATENT DOCUMENTS

| | | | |
|---|---|---|---|
| 4,674,893 | 6/1987 | Teramachi | 384/45 |
| 4,675,856 | 6/1987 | Rudy et al. | 369/34 X |
| 4,683,987 | 8/1987 | Sakata et al. | |
| 4,692,038 | 9/1987 | Kasai | 384/45 |
| 4,749,327 | 6/1988 | Roda | |
| 4,768,428 | 9/1988 | Silvestrini et al. | |
| 4,802,035 | 1/1989 | Ohtsuka | 360/92 |
| 4,844,679 | 7/1989 | Teranishi | 414/281 X |
| 4,860,133 | 8/1989 | Baranski | 360/92 |
| 4,864,511 | 9/1989 | Moy et al. | 364/478 |
| 4,984,106 | 1/1991 | Herger et al. | 360/92 |
| 5,003,417 | 3/1991 | Gradt | 360/92 X |
| 5,015,139 | 5/1991 | Baur | 414/281 |
| 5,020,958 | 6/1991 | Tuttabene | 414/281 |
| 5,064,337 | 11/1991 | Asakawa et al. | 414/283 X |
| 5,109,915 | 5/1992 | Osusko | 901/1 X |

FOREIGN PATENT DOCUMENTS

| | | | |
|---|---|---|---|
| 71201893 | 5/1971 | Fed. Rep. of Germany . | |
| 2503505 | 1/1975 | Fed. Rep. of Germany . | |
| 2754176 | 2/1977 | Fed. Rep. of Germany . | |
| 2911615 | 3/1979 | Fed. Rep. of Germany . | |
| 2519870 | 6/1979 | Fed. Rep. of Germany . | |
| 146268 | 9/1979 | Fed. Rep. of Germany . | |
| 3006205 | 2/1980 | Fed. Rep. of Germany . | |
| 2900194 | 11/1981 | Fed. Rep. of Germany . | |
| 3147285 | 11/1981 | Fed. Rep. of Germany . | |
| 158617 | 3/1983 | Fed. Rep. of Germany . | |
| 3612531A1 | 11/1986 | Fed. Rep. of Germany . | |
| 8631725.3 | 11/1986 | Fed. Rep. of Germany . | |
| 3621790 | 1/1988 | Fed. Rep. of Germany . | |
| 2564363 | 5/1985 | France . | |
| 122263 | 9/1980 | Japan | 360/92 |
| 156107 | 12/1980 | Japan | 414/280 |
| 56-124159 | 9/1981 | Japan . | |
| 56-124160 | 9/1981 | Japan . | |
| 60-61947 | 4/1985 | Japan . | |
| 60-118506 | 6/1985 | Japan . | |
| 61-11963 | 7/1986 | Japan . | |
| 61-158063 | 7/1986 | Japan . | |
| 61-170953 | 8/1986 | Japan . | |
| 1172840 | 12/1977 | U.S.S.R. . | |
| 1587056 | 3/1981 | United Kingdom . | |

OTHER PUBLICATIONS

Bittler Catalogue entitled "Bittler Modul Systeme", dated Oct. 1985.

"Sensor Review", Jan. 1983, pp. 39–43.

"VDI-Zeitschrift", 125 (1983), No. 5, pp. 143–149.

"Greifer fur Industrieroboter", in the periodical f & h–forden und heben, 28 (1978), No. 1, pp. 40–43.

Patent Abstracts of Japan, P–465, Jun. 7, 1986, vol. 10, No. 160.

"Magnetbandsystem IBM 3490: Kassetten-bandlaufwerke in Kompaktbauweise", IBM Form GT12–4273–2 (Nov. 1990).

"Fertigungssystem IBM 7575/Fertigungssystem IBM 7576", IBM Form GT12-3383-1, Feb., 1987.

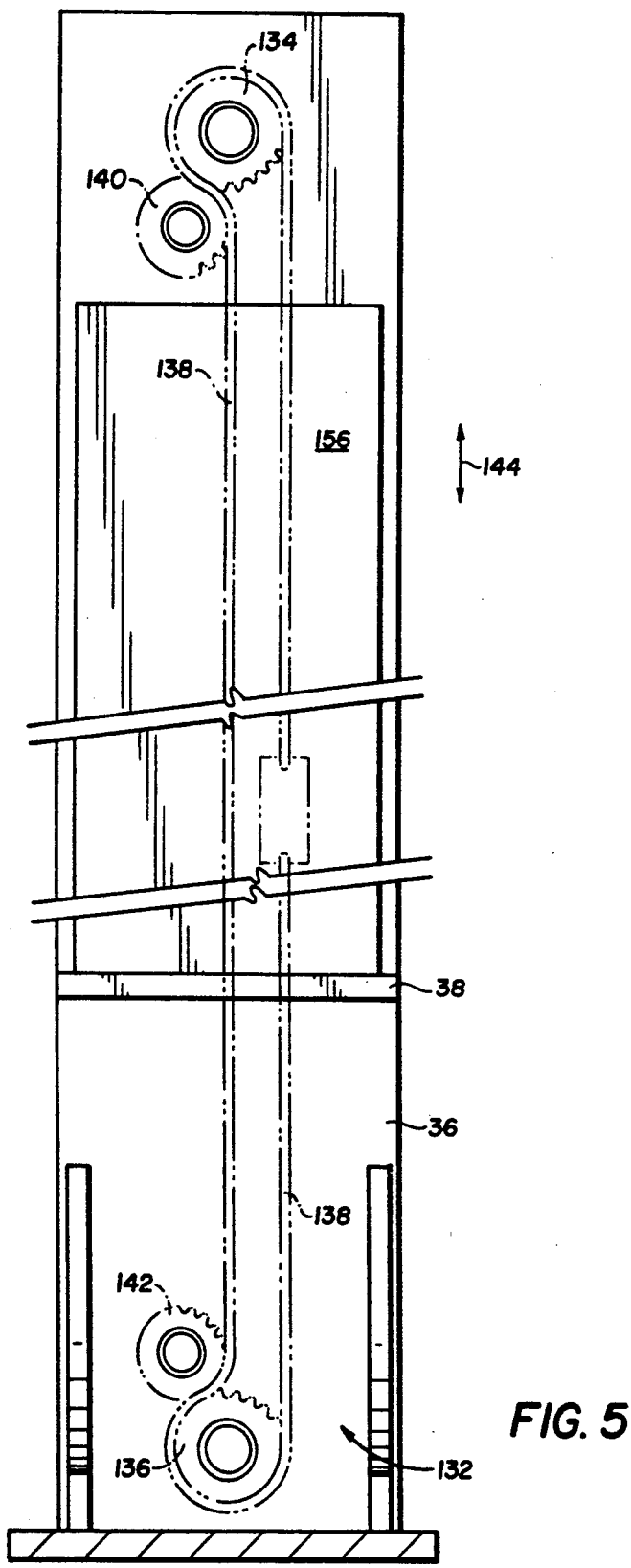
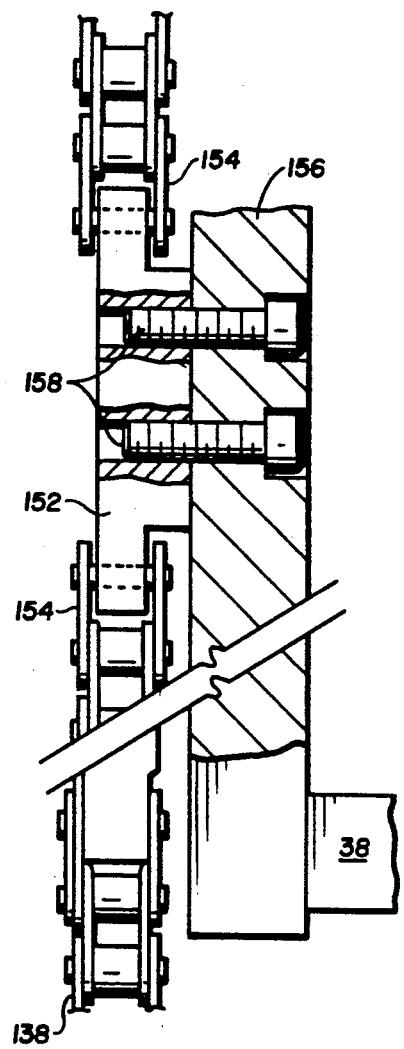
FIG. 5
FIG. 6

METHOD FOR TRANSPORTING COMPUTER DATA STORAGE CASSETTES BETWEEN A CASSETTE LIBRARY AND CASSETTE DRIVE

CROSS-REFERENCE TO PARENT APPLICATIONS

This application is a division of application Ser. No. 07/391,284 filed Aug. 9, 1989, now U.S. Pat. No. 5,015,139, which application is a continuation-in-part of application Ser. No. 07/182,593 filed Apr. 18, 1988, now abandoned and application Ser. No. 07/182,702 filed Apr. 18, 1988, now abandoned.

FIELD OF THE INVENTION

This invention relates to the robotics field. More specifically, the invention relates to especially adapted robotics systems and methods for the automated archiving and retrieval of computer data storage cassettes. The invention also includes an especially adapted manipulator which, in the preferred embodiment, is capable of interacting with the computer data storage cassette. In this regard, the invention is particularly well suited for use in automated mass data storage facilities such that data storage media (e.g., magnetic tape cassettes) may automatically be retrieved from a storage library site, conveyed to a media reading site (e.g., a cassette drive unit) and then inserted/removed from the media reading site. Means are provided according to the invention to assist interaction between the robot hand, the article and such library and media reading sites (e.g., via an article ejection member, an indexing mechanism, shock absorbing structures to prevent structural "crash" between the robot manipulator and the equipment with which it interacts, and the like).

BACKGROUND AND SUMMARY OF THE INVENTION

Today's large scale computer rooms typically employ human technicians which manually load magnetic data storage media (e.g. magnetic tape spools) onto computer drives. With the recent advent of computer tape cassettes (i.e., as represented by the IBM 7575 system), the space requirement for physically cataloging and storing the magnetic media has decreased (due to the decreased size of these tape cassettes as compared to the more conventional magnetic tape spools).

However, human intervention is still typically required when a tape cassette must be removed from, or inserted into, a computer's tape drive. Thus, it would be highly advantageous if an automated system was provided which was capable of retrieving a cassette from a library/storage location, transporting the cassette to a drive unit associated with the computer system, and then inserting the cassette into the drive unit. Such an automated system could also suitably be employed in a variety of other end use applications (i.e., other than in the context of a computer mass data storage facility), such as in radio and/or television broadcast stations whereby preprogrammed tape cassettes could automatically be retrieved from a library location and inserted into suitable playback equipment. Those in the art will undoubtedly appreciate other uses for the invention after considering the following description thereof. It is therefore towards attaining such an automated system that the present invention is directed.

The present invention achieves the advantages mentioned above by providing a complete system which is capable of moving an article (e.g., a data storage cassette) between a cassette library site and a cassette drive unit. To achieve this function, the robot system of the present invention includes a track which establishes a path of conveyance for the system between the cassette library and drive unit. A carriage assembly is coupled to the track and is capable of movements therealong by virtue of the meshed interengagement between a driven pinion gear (associated with the carriage assembly) and a gear rack (associated with one of the track members).

A robot is supported upon a platform which is coupled to a vertical column of the carriage assembly for slidable reciprocal movements between extreme lowered and raised positions (and any position intermediate these extremes). The platform (and hence the robot supported thereupon) is driven between these lowered and raised position by means of an endless flexible drive member (e.g., an endless chain) which is drivenly connected to a suitable reversible electric motor via a drive sprocket. Therefore, upon operation of the electric motor in one or another of its rotational directions, the platform (and hence the robot supported thereupon) is capable of being selectively displaced vertically between its raised and lowered positions, respectively. The transport system of this invention may thus assist in positioning the robot adjacent one of the separate equipment components with which it interacts (e.g., adjacent the cassette library or cassette drive unit), and moreover, may move the robot between that component and another one of the components so that it may then interact with the latter component.

The robot is provided with a manipulator hand which is especially adapted to grip and release a data storage cassette. The manipulator hand is, moreover, especially adapted to interact not only with the cassette, but also with the cassette drive unit, and more particularly, with an input slot of the drive unit.

More specifically, the manipulator hand includes a pair of finger members which collectively establish a space therebetween for accepting the cassette and which are relatively moveable between a gripped position (wherein the cassette is gripped between the finger members) and a released position (wherein the cassette is released from its gripped relationship with the finger members).

A mechanical ejector is also preferably provided so as to insure that the cassette is positively removed from the manipulator hand when the fingers thereof are relatively moved into their released position. This mechanical ejector is preferably embodied in a generally U-shaped ejector member having a forward end which engages the cassette when the robot manipulator is advanced to grip the cassette. Upon this advancement, the ejector member is retracted (due to its mounting structures to be discussed below) against the urging force of a pair of compression springs.

The finger members thus are relatively moved so as to grip the article when the robot manipulator has been advanced sufficiently. At the same time, the ejector member is "loaded" due to the compression of its springs. Therefore, when the finger members release the cassette, this "loaded" force will drive the ejector member forwardly to responsively eject the cassette from the robot manipulator. In this manner, the ejector member ensures that the cassette will not "hand" onto the finger members.

The robot manipulator also preferably includes a push rod which extends rearwardly in a direction opposite to the finger members. This push rod is especially adapted to physically push the tape cassette into its final operative position within the tape drive. Also, the push rod serves to engage a movable door associated with a slot on the tape drive. When the push rod engages the opened door (i.e., after the robot manipulator has initially inserted a cassette into the drive unit's slot and after the push rod has seated the cassette into the drive unit), the entire robot manipulator is then moved in a downwardly direction, so that the manipulator thus serves the additional beneficial function of closing the drive unit's door to thereby place it in operation.

Means are also provided to ensure that mechanical shocks to the manipulator are absorbed. In this regard, the entire housing of the manipulator is mounted upon guide rails which allow it to be displaced rearwardly when the finger members experience a shock (as by imprecise alignment between the finger members and the equipment with which they interact). A shock spring urges the robot hand into its forward-most position, yet resiliently cushions its rearward movement relative to the guide rails when a shock is experienced, thereby damping the same. A spring-based shock absorbing assembly is also in operative association with the push rod to accomplish similar shock-absorbing functions.

In many end use environments, it will be necessary to pivot the finger members between first and second planar orientations—particularly, for example, if the cassettes are physically stored at a library location in a vertical orientation, but are inserted into/removed from the drive unit in a substantially horizontal orientation. To compensate for this need, the present invention includes structure which permits the finger members to be pivoted between these first and second planar orientations. In this regard, the housing for the robot manipulator is mounted (a) for vertical movements between raised and lowered positions, (b) rotational movements between first and second positions, and (c) lateral movements between initial and final positions. A platform is also provided which establishes a bearing surface and is disposed in a fixed-position with respect to these housing movements.

A cylindrical engagement surface and a locking assembly are each provided in operative association with the housing. When the housing moves into its lowered position, a terminal end of the locking assembly contacts the bearing surface to thereby unlock the housing to allow it to freely rotate between its first and second positions. At the same time (i.e., with the housing in its lowered position), frictional engagement occurs between the cylindrical engagement surface and the bearing surface. This frictional engagement thereby provides the means for rotating the housing between its first and second positions when the housing is laterally moved from its initial position to its final position.

Further aspects and advantages of this invention will become more apparent to the reader after careful consideration is given to the detailed description of the preferred exemplary embodiment thereof which follows.

BRIEF DESCRIPTION OF THE DRAWINGS

Reference will be made hereinafter to the accompanying drawings wherein like reference numerals throughout the various FIGURES denote like structural elements, and wherein;

FIG. 5 is a front elevational view of the platform hoist column of the robot transport system;

FIG. 6 is a detailed cross-sectional elevation view of the connection between the platform and the hoist chain;

DETAILED DESCRIPTION OF THE PREFERRED EXEMPLARY EMBODIMENT

Figure 1:
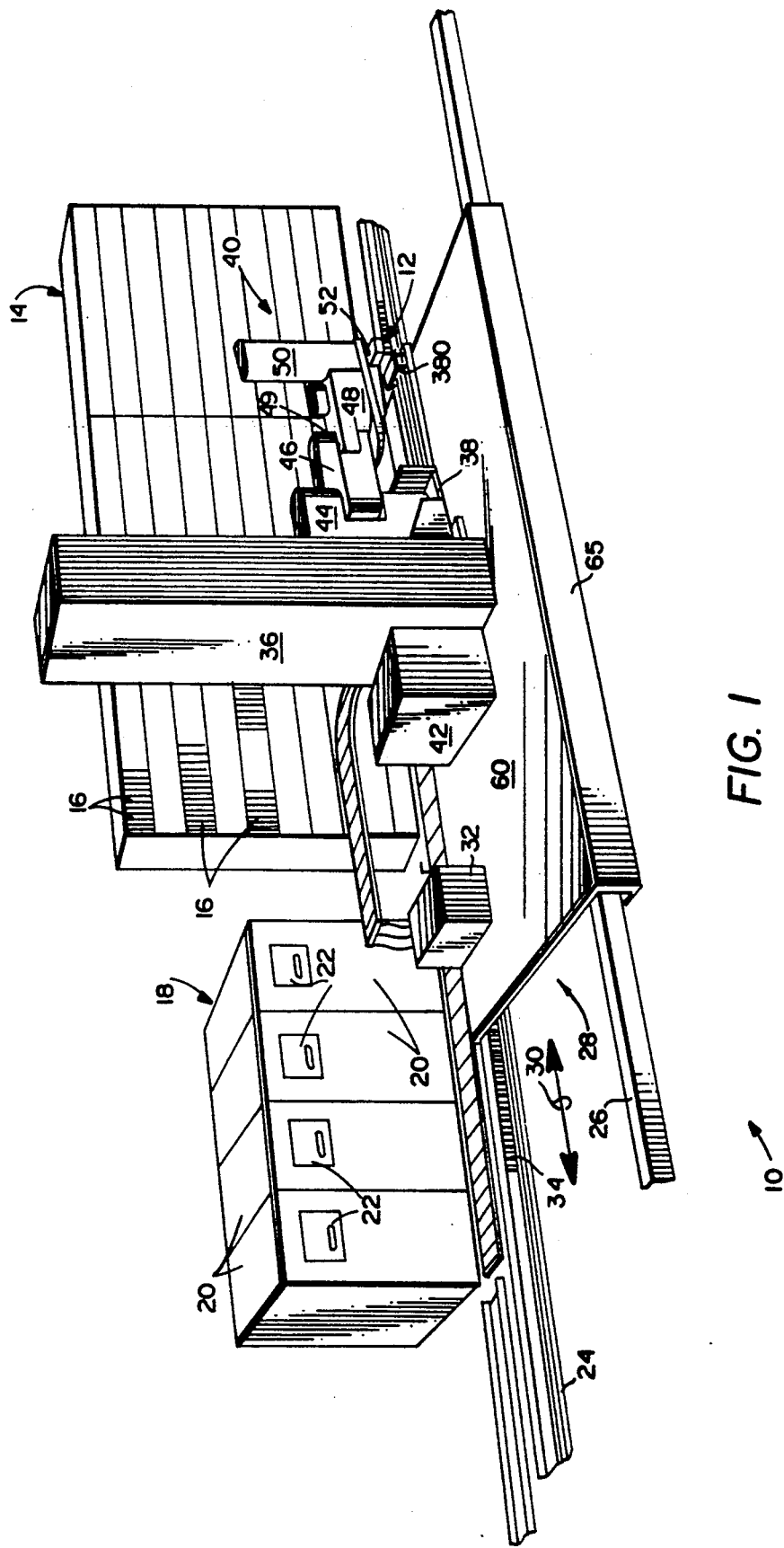
FIG. 1 is a schematic perspective view of a preferred robot transport system of this invention operating between a cassette storage site and a computer tape drive site.

A robot transport system 10 according to this invention which includes a robot manipulator 12 is shown schematically in FIG. 1 as operating between a cassette library site 14 (in which a number of magnetic tape cassettes 16 are catalogued) and a cassette drive site 18 having a number of individual drive units 20. The cassettes 16 are accepted within individual ones of the drive units 20 via a slot covered by a moveable door 22 (the doors 22 for each tape drive 20 being shown in FIG. 1 in a closed state).

Movement of the transport system 10 between the cassette library and drive sites 14, 18, respectively, is provided by means of parallel track members 24, 26 which are arranged adjacent both the library site 14 and the drive site 18. The tracks 24, 26 thus support a carriage assembly 28 for reciprocal rectilinear movements between the cassette library and drive sites 14, 18, respectively (e.g., in the directions shown by the arrow 30 in FIG. 1) provided by the interengagement between a pinion gear (not shown in FIG. 1, but to be discussed later) driven by a suitable reversible electric motor 32 and a gear rack 34 associated with the track member 24.

The carriage assembly 28 itself supports a vertical column 36 which includes a forward robot support platform 38 on which a robot assembly 40 is operatively mounted. The platform 38 is slidably mounted to the column 36 (in a manner to be discussed later) so as to be capable of vertical displacements between its extreme lowermost position (i.e., as shown in solid line in FIG. 1) and its extreme uppermost position (i.e., a position near the upper end of the column 30), in addition to positions intermediate these extremes. A reversible electric motor 42 operatively drives a hoist chain (not shown in FIG. 1) connected to the platform 38 to thereby raise/lower the same.

The robot assembly 40 includes a drive column 44 (which houses drive gears, precision motors, etcetera) and has a proximal arm member 46 radially extending therefrom. The proximal arm is, moreover, connected to the drive column 44 to permit articulated relative movements about a vertical axis. A distal arm member 48 is also connected to the proximal arm member 46 at the joint 49 to permit relative articulation of arms 46 and 48 about a vertical axis established at the joint 49. Another drive column 50 (which houses another set of drive gears, precision motors, etcetera, not shown) for positioning the robot manipulator 12 is provided at the terminal end of distal arm member 48. Operative interengagement between the robot manipulator 12 and the drive column 50 is achieved by means of a rotatable and vertically displaceable (i.e. via the drive column 50) support shaft 52.

As will be appreciated, precise positioning of the robot manipulator 12 vis-a-vis an article to be grasped (e.g., a cassette 16) may be achieved by selective movements of the proximal arm member 46 (i.e., pivotal movements about the vertical axis established with the drive column 44), distal arm member 48 (i.e., pivotal movements about the vertical axis established at the articulated joint 49), and/or the robot manipulator (i.e., pivotal movements about a vertical axis established by the support shaft 52 and/or vertical displacements of shaft 52), in addition to the vertical displacements of the entire robot assembly 40 due to the movements of the platform 38 on which the robot assembly 40 is carried. All such movements may be programmed in a suitable microprocessor-based control system (not shown) so as to achieve precise predetermined movements of the robot manipulator 12 relative to an article and relative to other equipment (e.g., the drive units 20) thereby allowing the transport system 10 to achieve desired functions.

Figure 2:
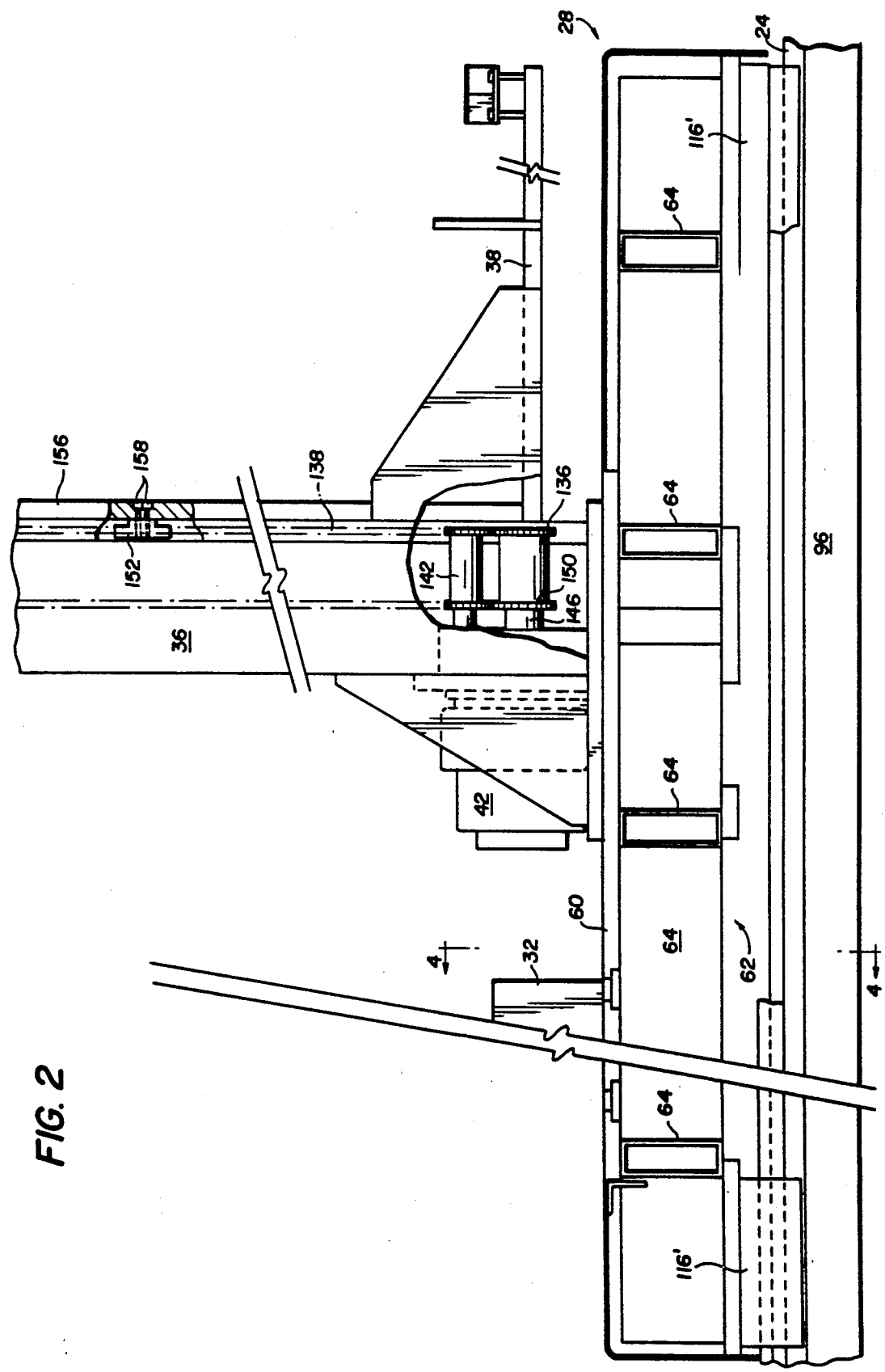
FIG. 2 is a side elevational view of the carriage assembly of this invention.
Figure 3:
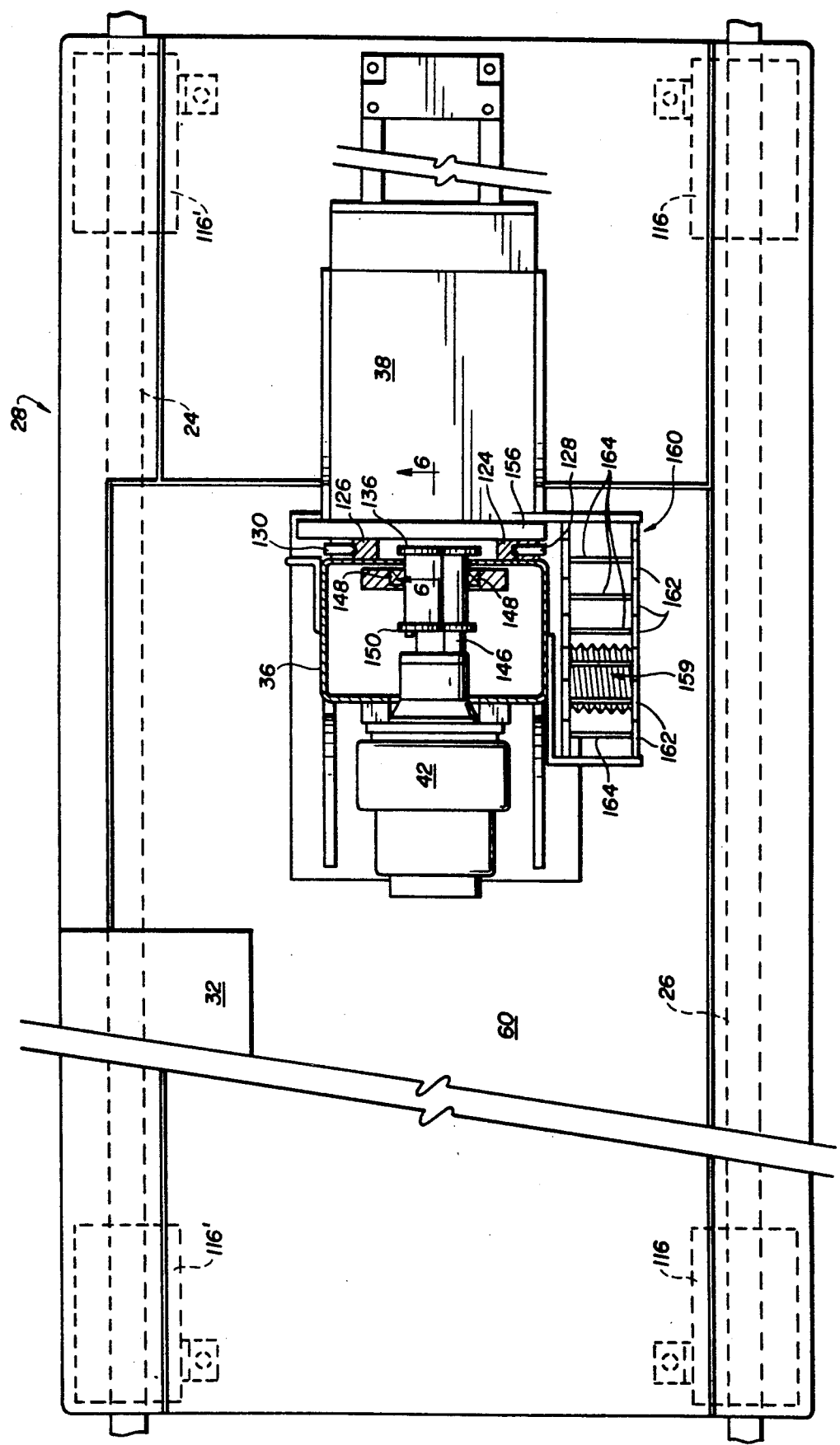
FIG. 3 is a top plan view of the carriage assembly shown in FIG. 2.
Figure 4:
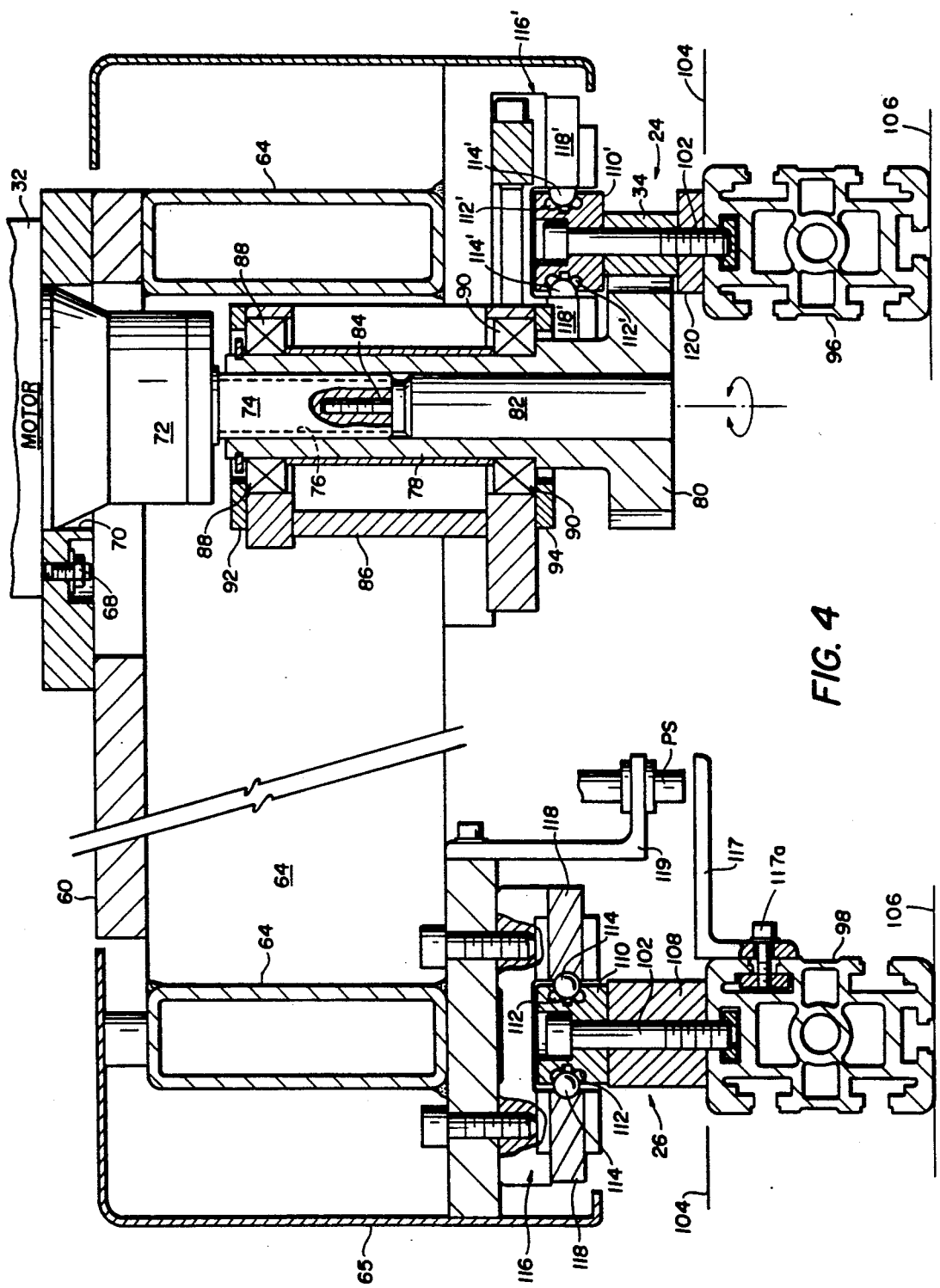
FIG. 4 is a cross-sectional elevational view of the carriage assembly shown in FIG. 2 as taken along line 4—4 therein.

FIGS. 2-4 show in greater detail the carriage assembly 28 of this invention and its operative interengagement to the track members 24, 26. As is seen, the carriage assembly 28 includes a planar support plate 60 rigidly connected to an undercarriage frame 62 comprised of multiple rigid beams 64. Preferably, lateral skirts 65 are attached to, and thus hide, the undercarriage frame 62. A control center (not shown) may be positioned rearwardly of the column 36 so as house a variety of electronic control means (i.e., logic boards, signal converters, etecetera) to receive the position signals generated by the sensors associated with the transport assembly 10 and/or the robot 40 and thus provide an interface with a console and/or a central processor (not shown).

Driven movements of the carriage assembly 28 along the tracks 24, 26 is provided by reversible electric motor 32 as can be seen more clearly in FIG. 4. As is seen, the motor 32 is rigidly mounted upon a motor support plate 66 via suitable bolts 68 (only one such bolt 68 being visible in FIG. 4) which defines a central recess 70 through which the drive shaft 72 of motor 32 extends. A spline shaft 74 is rigidly coupled at its upper end to the drive shaft 72 and is coaxially mated with the spline cavity 76 defined by the pinion gear shaft 78 (integrally associated with the pinion gear 80). A shaft extension 82, rigidly coaxially provided with the pinion shaft 78, is, in turn, rigidly coupled to the spline shaft 74 via a threaded bolt extension 84.

A shaft support frame 86 is rigidly coupled to the carriage assembly's undercarriage frame 64 and carries a axially spaced-apart pair of bearings 88, 90 so as to journally mount the pinion gear 80 for rotation about the vertical axis established by the pinion gear shafts 78. Upper and lower retainer plates 92 and 94 respectively retain the bearings 88 and 90 in operative associate with the pinion gear shaft 78.

The track members 24, 26 are each rigidly coupled to support beams 96, 98 via bolts 100, 102, respectively. As is seen in FIG. 4, the support beams 96, 98 are preferably disposed below the level of the computer room floor 104 (or the floor of any other facility in which the present invention may be employed) in the space between it and a subfloor 106. The space between the floor 104 and the subfloor 106 thus permits control cabling and the like to be run unexposed to/from the transport system 10.

Track member 26 is comprised of a lower support block 108 and an upper track block 110. Track block 110 establishes a pair of lateral recessed track guides 112 which receive ball bearings 114. The carriage assembly 28 is thus slidably coupled to the track member 26 through these bearings 114 via inverted U-shaped track couplers 116 disposed at each corner of the carriage assembly 28 in superjacent relationship to the track member 26 (see also FIG. 3). Rigid coupling of the track couplers 116 to the undercarriage frame 64 is provided by means of bolts 117. The track couplers 116 therefore include a pair of dependent bearing flanges 118 which are disposed laterally adjacent a respective one of the track rails 112 of the upper track block 110 with the bearings 114 disposed therebetween.

The track member 24 also preferably includes a number of angle brackets 117 fixed to the support beam 98 via bolts 117a at predetermined longitudinally spaced-apart locations therealong (it being understood that only a representative one of the angle brackets 117 is apparent in FIG. 4). A proximity sensor PS of a well known variety is carried by the undercarriage frame 64 of the carriage assembly 28 so as to move in superjacent relationship with respect to the brackets 117. Therefore, as the carriage assembly moves along the tracks 24 and 26, the proximity sensor PS is capable of sensing the presence of the brackets 117 so that the carriage assembly's position along the tracks 24 and 26 may be ascertained by suitable control algorithms associated with the controller (not shown). Thus, by "counting" the number of brackets the proximity sensor has passed during the carriage assembly's travel along the track members 24 and 26, and comparing this number to a "zeroed" state, the precise position of the carriage assembly may be determined. Obviously, other position sensing techniques well known to those in this art may also be employed.

The track member 24 also includes an upper track block 110' configured in a manner similar to that discussed above with reference to the upper track block 110 of track member 26. Therefore, those structures associated with track member 24 which are substantially similar to those structures already discussed above with reference to track member 24 have been identified by a prime (') notation following the reference numerals in the accompanying drawing FIGURES. Thus, a duplicate discussion of these similar structures is not believed to be necessary.

The track member 24, however, differs from track member 26 in the provision of the gear rack 34 interposed between a spacer plate 120 and the upper track block 110'. The upper track block 110', gear rack 34, and the spacer plate 120 are rigidly coupled in that order to the support beam 96 via bolts 102'. As is seen in FIG. 4, the pinion gear 80 is intermeshed with the teeth of the gear rack 34 so that upon driven rotation of the pinion gear 80 in one or the other of its rotational directions (e.g., in one of the opposite directions indicated by the arrow 122 in FIG. 4), the entire carriage assembly 28 will be propelled forwardly or rearwardly (e.g., in one of the directions indicated by the arrow 30 in FIG. 1) along the track members 24 and 26. In such a manner, the carriage assembly 28 may be moved between the cassette library and drives sites 14 and 18, respectively (or between other spaced-apart equipment components adjacent to the path established by the track members 24 and 26).

Referring specifically to FIG. 3, it is seen that the robot platform is operatively coupled to guide rails 124, 126 forwardly of the column 36 by means of bearing connectors 128, 130, respectively. In this manner the platform is capable of reciprocal rectilinear vertical movements between extreme lowered and raised positions, as was briefly discussed above. This lowering/raising of the platform 38 is accomplished a hoist assembly 132 which is more clearly shown in FIGS. 5 and 6.

As is apparent, the hoist assembly is generally comprised of upper and lower sprocket wheels 134, 136, respectively, around which an endless flexible drive chain 138 is operatively engaged. Adjustable tension sprockets 140, 142 are also provided in operative engagement with the drive chain 138 near the sprocket wheels 134 and 136, respectively, so that the correct tension is maintained upon the drive chain 138 during vertical movements of the robot platform 38.

The sprocket wheel 136 is driven for rotational movements in either clockwise or counterclockwise directions as viewed in FIG. 5 (i.e., so as to responsively effect vertical displacements of the platform 38 in the direction of arrow 144 towards the platform's lowered or raised positions, respectively) by means of the electric reversible motor 42. That is, the sprocket wheel 136 is fixed to the output shaft 146 (see FIG. 3) so that the former rotates in the same predetermined direction as the latter. It should be understood that the upper sprocket wheel 134 is not driven (although it could be, if desired), but rather is merely freely journalled to the column 36. The sprocket wheel 136 is, moreover, mounted for rotation via gearing blocks 148 as is seen in FIG. 3. As is also noted in FIG. 3, another sprocket wheel 150 is coaxially provided on shaft 146 of motor 42 so as to drive another endless chain member about an upper idler sprocket (not shown) so as to assist in the balancing of the hoist assembly 136 and thus minimize the load upon motor 42.

The robot platform 38 is itself fixed to drive chain 138 by means of a spacer block 152 mounted between opposed end-links 154 of the chain 138, as is shown more clearly in FIG. 6. The rear plate 156 of the platform 38 is thus rigidly coupled to this spacer block 152 by means of suitable bolts 158 to, in turn, couple the platform 38 for vertical movements along column 36 as previously discussed.

Since electrical cabling (identified in FIG. 3 by numeral 159) is required to establish electrical communication between the robot 40 and the control system (not shown), the cabling must be permitted to "follow" the platform during its vertical displacements along the column 36. To permit this (and to prevent the cabling from interfering with such platform displacements), an articulated cable support 160 is provided (see FIG. 3). The cable support is comprised of a series of support links 162 which are joined to one another for relative articulated movements via pivot pins 164. The pivot pins 164 also serve to permit the cabling to be physically attached thereto so that it may move together with the cable support 160. Of course the cable support 160 must be of sufficient length to permit it to follow the robot platform 38 to the latter's extreme raised position.

Figure 7:
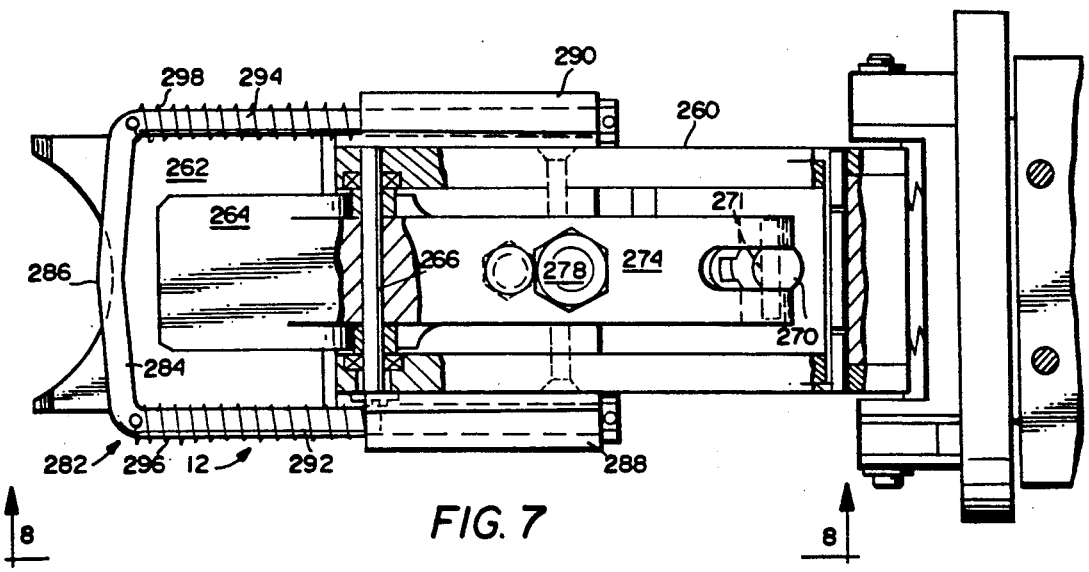
FIG. 7 is a top plan view, partially sectioned, of the manipulator hand of this invention.
Figure 8:
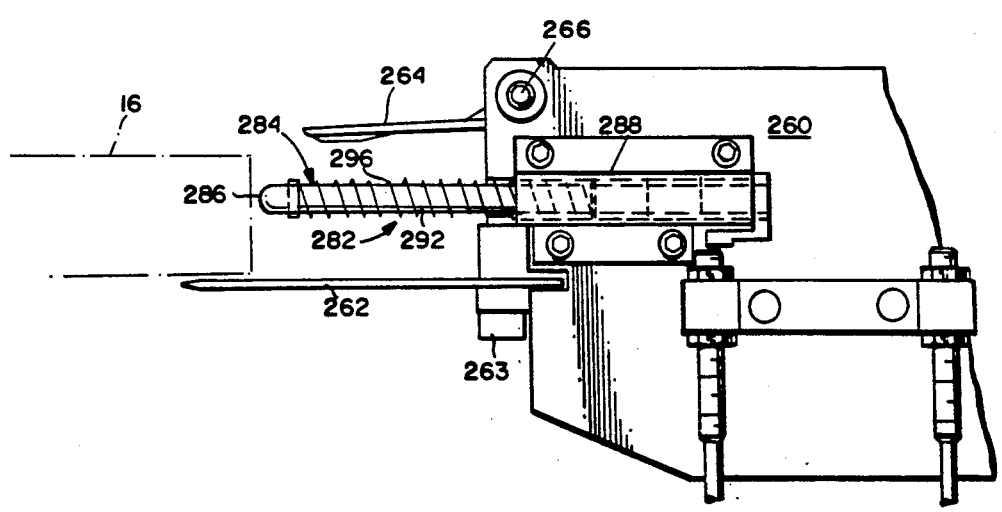
FIG. 8 is a partial side elevational view of the forward gripping end of the manipulator hand shown in FIG. 7 and taken along line 8—8 therein.
Figure 9:
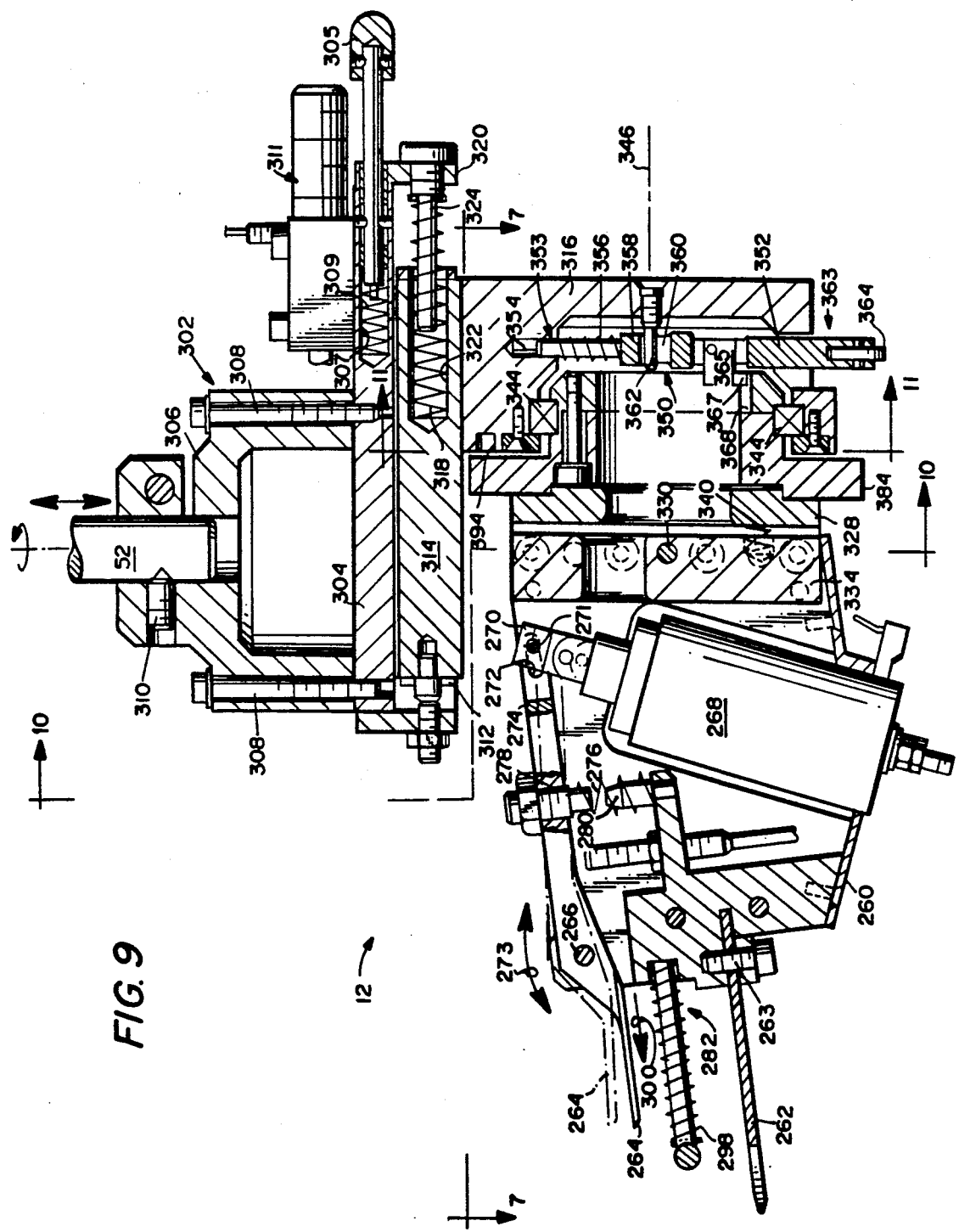
FIG. 9 is a cross-sectional side elevational view of the manipulator hand of this invention.

The robot manipulator 12 according to the present invention is more clearly shown in accompanying FIGS. 7-9. As is seen particularly in FIGS. 7 and 8, the robot manipulator 12 generally is comprised of a housing structure 260 having a pair of forwardly disposed finger members 262 and 264, respectively. The lower finger member 262 is rigidly coupled to the housing 260 via suitable bolts 263 whereas the upper finger member 264 is pivotally connected to the housing 260 via a cross-axle 266. The separation distance between the upper and lower fingers 264 and 262, respectively, is sized and configured to accept an article, for example, a cassette 16, with which it interacts.

An actuator 268 is also contained within the housing structure 260 as is shown more clearly in FIG. 9. The actuator 268 includes an actuator rod 270 which is connected via a pin 271 to an elongate slot 272 defined in a proximal end 274 of the upper finger member 264. The actuator 268 is preferably an electro-magnetic type such that, upon energization, the actuator rod 270 will be drawn inwardly so as to responsively cause the upper finger member 264 to pivot (i.e., clockwise as indicated by arrow 273 in FIG. 9) about its axle 266 to the position noted in chain line in FIG. 9. This pivotal movement thereby increases the dimension between the upper and lower finger members 264 and 262, respectively, so that they are relatively moved into a "released" position. Upon deenergization, the actuator rod 270 returns to its "normal" state (i.e., as shown in solid line in FIG. 9 under the bias force assistance of compression spring 276 operating between a retainer 278 (associated with proximal end 274 of finger 264) and a retainer 280 (rigidly associated with housing 260). While in its "normal" position, it will be noted that an article (such as a cassette 16 will be gripped by the finger members 262 and 266, and thus be capable of manipulation by the robot manipulator 12. Other forms of actuators, such as electrical, pneumatic, or hydraulic types, or hybrids of such types, may also be suitably employed according to this invention.

An article ejector assembly 282 is also provided according to this invention and operates within the space defined between the upper and lower finger members 264 and 262, respectively. In the preferred embodiment, the ejector assembly 282 includes a general U-shaped ejector member 284 whose forward end 286 contacts the tape cassette 16 when the robot manipulator 12 is advanced relative to the cassette. Support structures 288, 290 on either side of the housing 260 support and mount the lateral arms 292, 294, respectively, of ejector member 284 for sliding rectilinear movement between extended and retracted positions. Compression springs 296, 298, respectively associated with each arm 292, 294 of the U-shaped ejector member 284 bias the ejector member 284 in a direction towards its extended position (i.e., in the direction of arrow 300 in FIG. 9).

The spring force of the coil springs 292 and 294 is increased ("loaded") when the robot manipulator 12 advances relative to the cassette 16—that is, when the ejector member 284 is moved from its extended position towards its retracted position. Therefore, when the griping relationship of the cassette 16 between the two opposed fingers 262, 264 is released (as by activating the actuator 268 to pivot the upper finger 264 clockwise as viewed in FIG. 9 in the manner described above), this loaded spring force will recoil to urge the ejector member 284 from its retracted position towards its extended position thereby ejecting the article (in this case the cassette 16) forwardly of the robot manipulator 12. Thus, the article does not "hang" onto the finger members 262, 264 due to the operative presence of this ejector assembly 282.

The robot manipulator 12 is itself mounted to the support shaft 52 via a shock-absorbing subassembly 302 which is shown more clearly in FIG. 9. This subassembly 302 generally includes an upper support plate 304 rigidly connected to a hub 306 via bolts 308. Hub 306 is, in turn, rigidly connected to the support shaft 52 via a set screw 310. The upper support plate 304 establishes a pair of guide rails 312 (only one rail 312 being shown in FIG. 9, but see FIG. 11) so as to slidably receive a lower support plate 314 which dependently rigidly supports a mounting block 316. Suitable bearings 317 are disposed between the lower plate 314 and the guide rails 312 so as to allow relative sliding movement therebetween.

A compression spring 318 operates between the rear flange 320 and a recess 322 of the lower support plate 314 and thus biases the lower support plate 314 in a forwardly direction (i.e., leftward as viewed in FIG. 9). The force of the compression spring 318 may be adjusted by turning an adjustable threaded rod 324 so as to, in turn, adjust the amount of force absorbed by the compression spring 318. As will be appreciated, if a shock is experienced by the robot manipulator (as by abutting against another structural member during its relative advancement), the sliding interconnection between the upper and lower support plates, 304 and 314, respectively, will allow the lower support plate 314 (and hence the block 316/housing 260) to be displaced rearwardly (e.g., approximately 10 mm) against the force of the compression spring 318. The compression spring 318 thus absorbs this experienced shock and, moreover, will assist the return of the housing 260 to its "normal" forward position (i.e., as shown in FIG. 9).

The upper support plate 304 also carries a rearwardly projecting push rod 305 which is slidably received within a recess 307 of the upper support plate 304. A compression spring 309 housed within the recess 307 the upper support plate 304 biases the push rod 305 into its extended position as is shown in FIG. 9.

The push rod 305 is used, in the preferred embodiment of the invention, as a means to push the cassette into its seated operative position within a drive unit 20, in addition to closing the drive unit's door 22 once the cassette has been inserted. In this regard, minor shocks which may be experienced by the push rod 305 are effectively absorbed by the compression spring 309 due to the rod's 305 sliding engagement within recess 307.

To protect against major mechanical shocks (i.e., of a sufficient magnitude to drive the rod 305 into a retracted position within recess 307), there is provided a shock-absorbing plunger assembly 311 mounted above rod 305 on upper support plate 304. As is appreciated, a major impact between the rod 305 and another structure will drive the rod into recess 307, but not to an extent before the other structure contacts the plunger assembly 311 thereby preventing mechanical "crash" between the manipulator 12 and that other structure.

Figure 10:
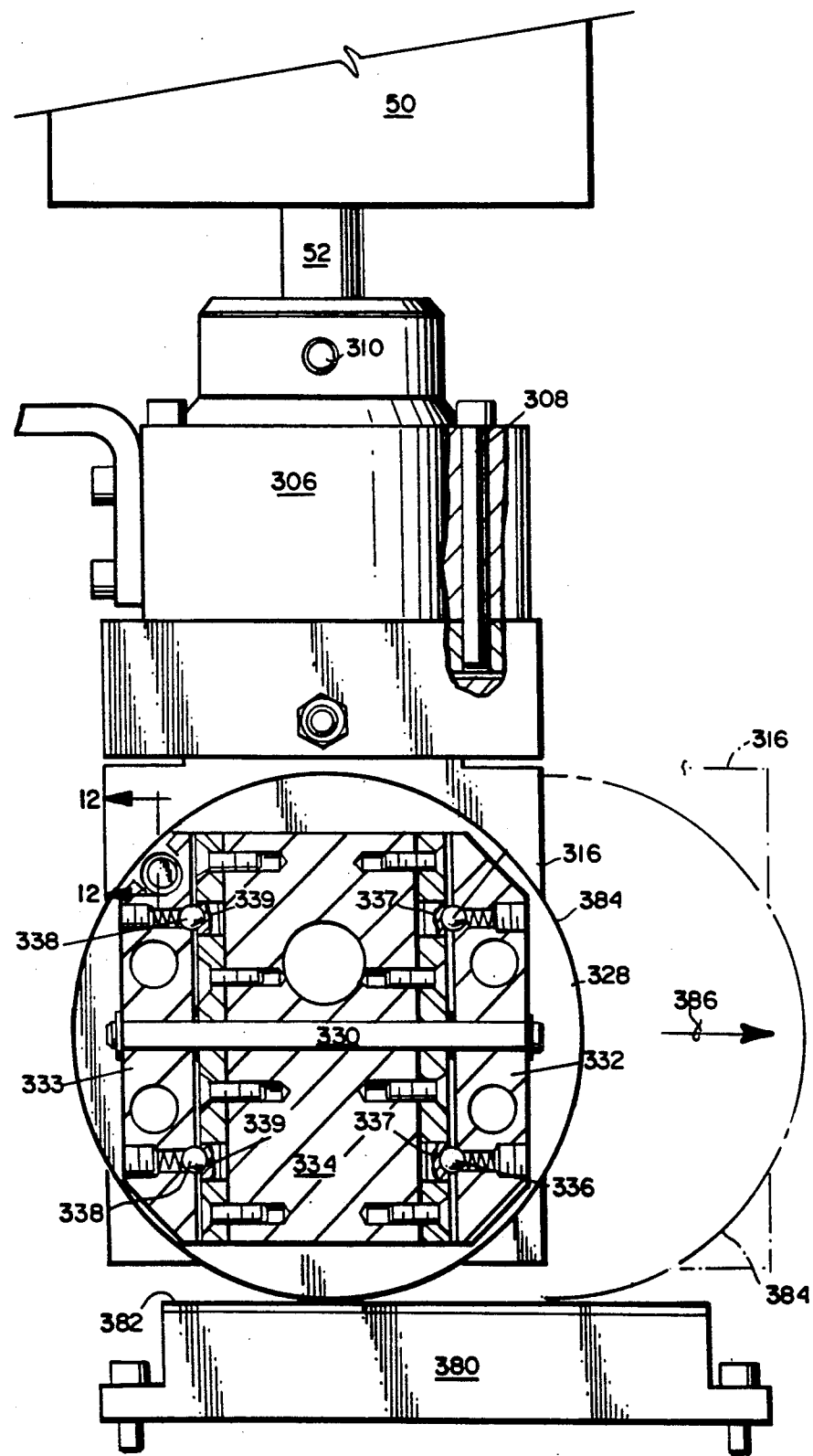
FIG. 10 is a cross-sectional front elevational view taken along line 10—10 in FIG. 9.

Minor shock absorbing capabilities are also provided by means of the interconnection of the housing structure 260 to its rearward mounting collar 328, as shown more clearly in FIG. 10. As is seen, a pivot axle 330 extends between a pair of spaced-apart flanges 332, 333 rigidly associated with the mounting collar 328. The axle 330 thus couples the rear plate 334 of the housing 260 to the flanges 332, 333 (and thus also to the mounting collar 330). Paired spring-biased ball detents 336, 338, respectively, provided with the flanges 332, 333 are urged into engagement within recesses 337, 339 formed in rear plate 334 of housing 260. A cushioning spring 340 (see FIG. 9) is positioned between the mounting collar 328 and the rear plate 334 of housing 260 and operates to urge the ball detents 336, 338 into registry and engagement with their respective recesses 337, 339, respectively. That is, spring 340 urges the rear plate 334 to pivot clockwise (as viewed in FIG. 9) about axle 330 so as to align the ball detents 336, 338 with recesses 337, 339, respectively. If a relatively minor shock is experienced, the entire housing is capable of pivoting slightly about the axle 330 towards mounting collar 328 against the force of the spring 340 (i.e., counterclockwise as viewed in FIG. 9). When the housing 260 is urged to pivot against the force of the spring 340 (as when relatively minor shocks are experienced), the ball detents 336, 338 will be forced out of engagement with their respective recesses 337, 339. However, when the shock has subsided, the force of the spring 340 will urge the housing 260 so that it pivots into its normal position (i.e., clockwise as viewed in FIG. 9)—that is, a position whereby the ball detents 336, 338 are again registered with their respective recesses 337, 339.

The mounting collar 328 is journally coupled to the support block 316 via suitable ball bearing ring 344 so as to allow the mounting collar 328 (and hence the manipulator housing 260) to be rotated about an axis 346 established by the mounting collar 328. The mounting collar 328, due to this journalled mounting to the support block 316, allows the housing 260 (and thus the finger members 262, 264) to be rotated between first and second orientations about the axis 346. In the preferred embodiment, this positional rotation of the housing 260 is important since many of the cassettes 16 are typically stored in a vertical orientation, but yet are needed to be moved into a substantially horizontal orientation before insertion into a respective drive unit 20. Therefore, the present invention allows this positional rotation so as to move the finger members 262, 264 between two different planar orientations.

The manner in which this relative rotation occurs will now be described below with reference to FIGS. 9-11. As is seen more clearly in FIG. 9, the support block 316 is provided with a locking plunger assembly 350 which is comprised of a plunger rod 352 having an upper end 353 received within a recess 354 defined within the support block 316. A compression spring 356 acts between the support block 316 and a plunger collar 358 which defines a surface 360 for accepting a position sensor 362. The other, lower end 363 of the plunger rod 356 projects from the block 316 and includes a journally mounted bearing wheel 364. A stop member 365 is rigidly attached to the plunger rod 356 and includes a downwardly turned stop 367 which is accepted within one of the stop recesses 368, 370 (only recess 368 being visible in FIG. 9, but see FIG. 11).

In the preferred embodiment shown, the stop recesses 368, 370 are oriented relative to one another so that they are circumferentially spaced apart by an angle of substantially 90°. Thus, when the stop flange 367 is engaged with recess 368, the finger members 262, 264 are in a substantially horizontal orientation (as shown in the accompanying drawing FIGURES). When, however, the stop flange 367 is engaged with stop recess 370, the finger members 262, 264 will then be in a substantially vertical orientation.

When it is desired to rotate the finger members from the horizontal orientation as shown e.g., in FIG. 9, to a substantially vertical orientation, the entire robot manipulator is caused to be moved via the drive column 50 and shaft 52 downwardly relative to a bearing plate structure 380 (carried forwardly of the robot platform 38—see, FIG. 1) having a bearing surface 382 of a suitable friction material (e.g., an elastomeric material or the like). This downward relative movement causes the wheel 364 of the plunger 352 to engage the surface 382 and thus responsively upwardly move the plunger against the bias force provided by the compression spring 356. This upward responsive movement of the plunger 352, in turn, disengages the stop member 365 from the stop recess 368 thereby unlocking the collar 328 (and hence the housing 260) to allow for rotation about axis 346.

Downward movement of the manipulator 12 also causes the outer cylindrical surface 384 of the mounting collar 328 to frictionally engage the surface 382 of the bearing plate 380 (see FIG. 10). It will be noted that this frictional engagement between surfaces 382 and 384 occurs only after the manipulator 12 has been downwardly moved sufficient to release the locking interengagement between the stop member 365 and the stop recess 368. In this condition, when the robot manipulator is laterally moved (i.e., in the direction of arrow 386 in FIGS. 10 and 11) the frictional engagement between the outer cylindrical surface 384 of the mounting collar 328 and the bearing surface 382 will responsively cause collar 328 to roll along surface 382 and thus rotate in a clockwise direction until it reaches a final position as shown by the phantom lines in FIGS. 10 and 11.

When the robot manipulator 12 has laterally moved sufficient to rotate the mounting collar 328 in a clockwise direction through 90°, the manipulator 12 may then be raised via drive column 50/shaft 52 so as to allow the plunger 352 to move downwardly (as viewed in FIG. 9) under the encouragement provided by the spring 356 so as to cause the stop flange 367 to be received by the other stop recess 370. In this manner, the orientation of the finger members 262, 264 may be rotated through an angle of 90°—that is, from a substantially horizontal orientation to a substantially vertical orientation. Of course, reverse operation of the sequence just described will move the orientation of the finger members from a substantially vertical position and return them to a substantially horizontal position, as may be desired.

Figure 11:
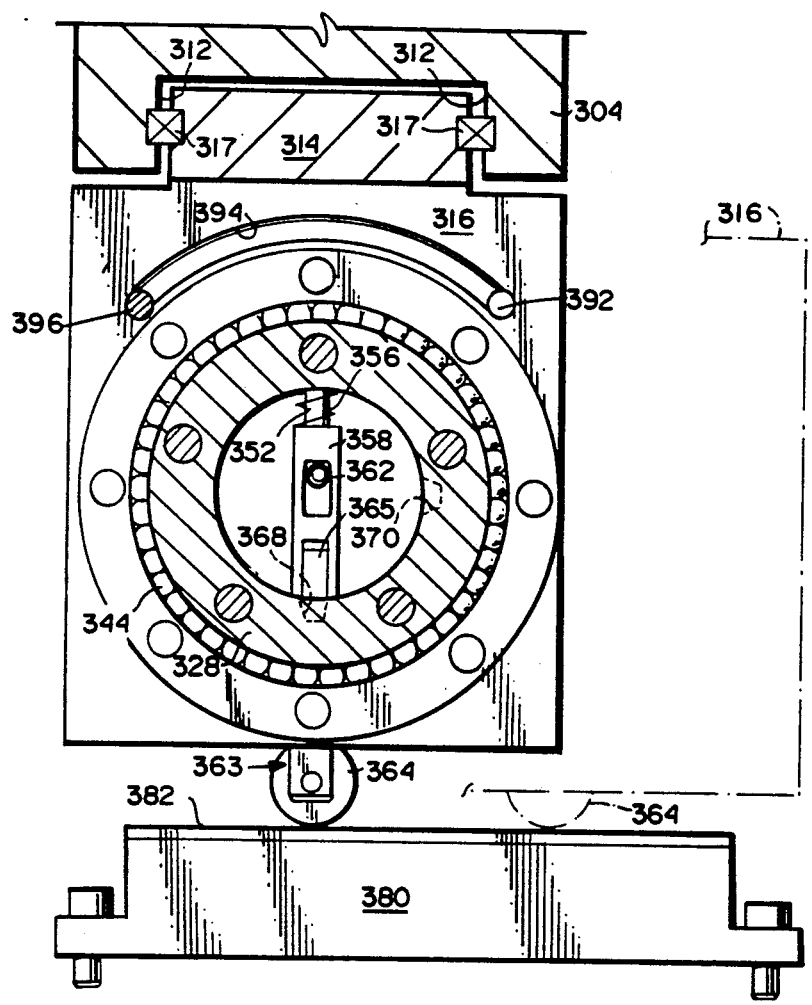
FIG. 11 is a cross-sectional front elevational view of the mounting collar for the robot manipulator as taken along line 11—11 in FIG. 9.
Figure 12:
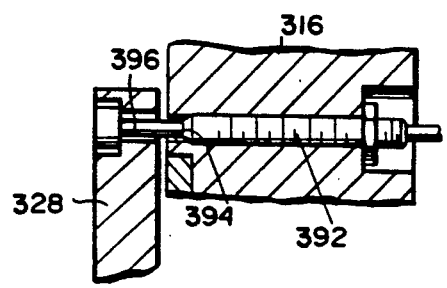
FIG. 12 is a detailed elevation view of a proximity position sensor as taken along line 12—12 in FIG. 10.

A proximity sensor 392 is provided at each end of a recessed arc 394 defined in the support block 316 as is shown in FIGS. 11 and 12. Each proximity sensor 392 is thus capable of sensing the position of a pin 396 when the pin is opposite a respective one of the sensors 392 so as to issue a position signal to the control system (not shown) and thus provide an indication of the relative orientation of the finger members 262, 264.

Figure 13:
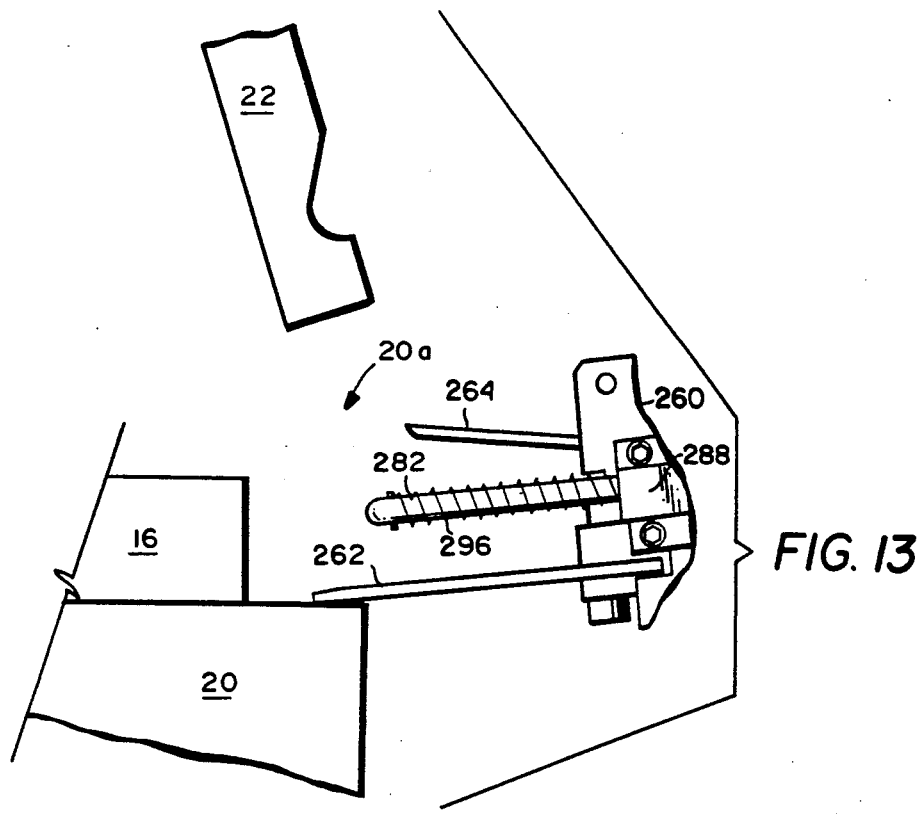
FIGS. 13-15 show schematically the physical interaction between the finger members of this invention and a cassette relative to a cassette drive.

The operation of the present invention will now be described in greater detail with respect to FIGS. 13-16. As is shown in FIG. 13, a cassette 16 is depicted as already being positioned in a slot 20a of a cassette drive unit 20 while the robot manipulator 12 is being relatively advanced towards the cassette 16 (for example, as provided by the articulated movements between arms 46 and 48). In this state, the door 22 of the drive unit 20 is open so as to allow the finger members 262, 264 to penetrate into the slot 20a and thereby engage the tape cassette 16. The upper finger member 264 during this state has been pivoted to its released position (i.e., as shown by the solid line in FIG. 13 by energizing the actuator 268. As described briefly above, continued relative advancement of the robot manipulator 12 towards the cassette 16 causes the ejector member 284 to retract from its extended position (i.e., as shown in FIG. 13) to its retracted position (i.e., as shown in FIG. 15).

Once the robot manipulator 12 has advanced towards the cassette 16 sufficient to allow the cassette 16 to be gripped by the finger members 262, 264, the actuator 268 is deenergized thereby allowing the actuator rod 270 to move upwardly (under the bias force provided by the compression spring 276) which, in turn, pivots the upper finger member 264 about axle 266 into gripping engagement with the cassette 16. This state is shown in FIG. 15.

Figure 15:
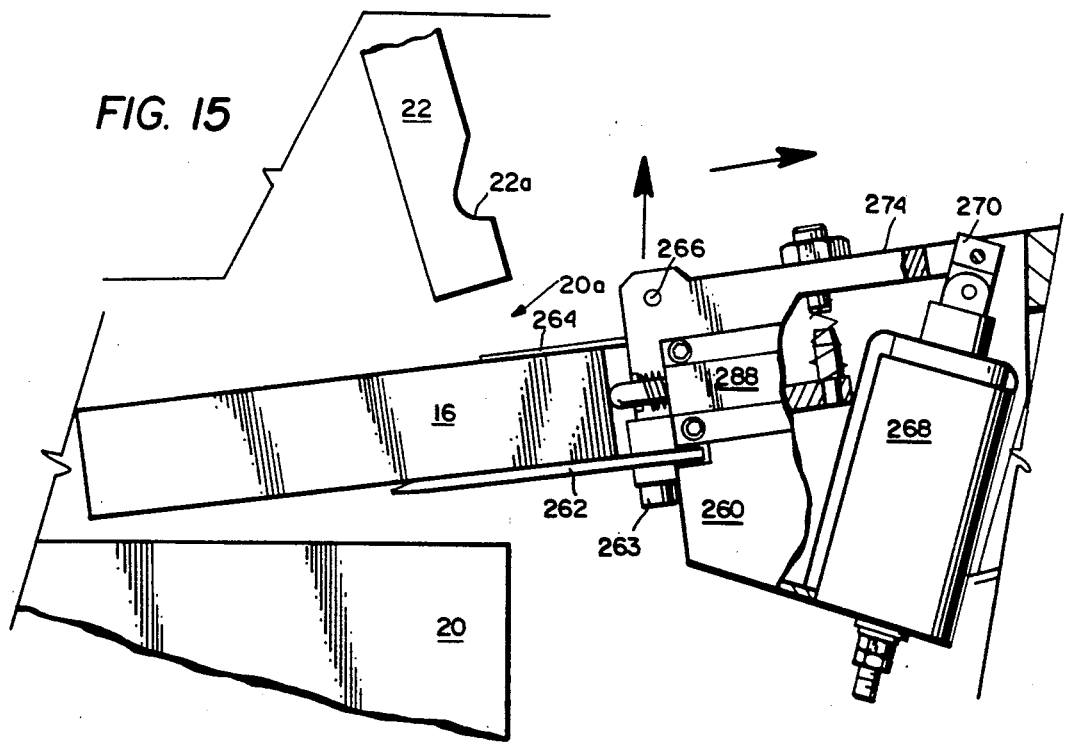

With the cassette 16 gripped between the finger members 262, 264, the robot manipulator 12 may then be moved (for example, due to articulated relative movement between the arms 46, 48) so as to withdraw the cassette 16 from the drive unit's slot 20a (i.e., in the directions of both arrows in FIG. 15).

The insertion of the cassette 16 into the slot 20a of the drive unit 20 proceeds in a reverse manner. Thus, with the tape cassette 16 gripped between the upper and lower fingers 262, 264, respectively, as shown in FIG. 15, the robot hand is advanced towards the slot 20a of the drive unit 20. This relative advancement of the robot manipulator 12 continues until the cassette 16 is initially positioned appropriately within the slot 20a of the drive unit 20, at which time the actuator 268 is energized to downwardly displace the actuator rod 270 and thereby pivot the upper finger member 264 to its released position. Upon movement of the upper finger member 264 to its released position, the energy stored in the compression springs 296, 298 of the ejector assembly 282 causes the ejector member 284 to move forwardly from its retracted position (i.e., as shown in FIG. 15) to its extended position (i.e., as shown in FIG. 13). With the cassette 16 initially placed within the drive unit 20 in the manner described, the robot manipulator 12 may then be moved away from the slot 20a.

This initial placement of cassette 16 within drive unit 20 is usually, however, insufficient to properly seat the cassette 16 for operation. In this regard, the manipulator 12 may be rotated about the axis of shaft 52 (as by means of the drive column 50) so that the push rod 305 extends towards the drive unit's slot 20a. By again advancing the manipulator 12 towards the slot 20a, the push rod 305 will be caused to contact cassette 16 thereby providing a final push to properly seat the cassette 16 for operation within the drive unit 20.

Figure 16:
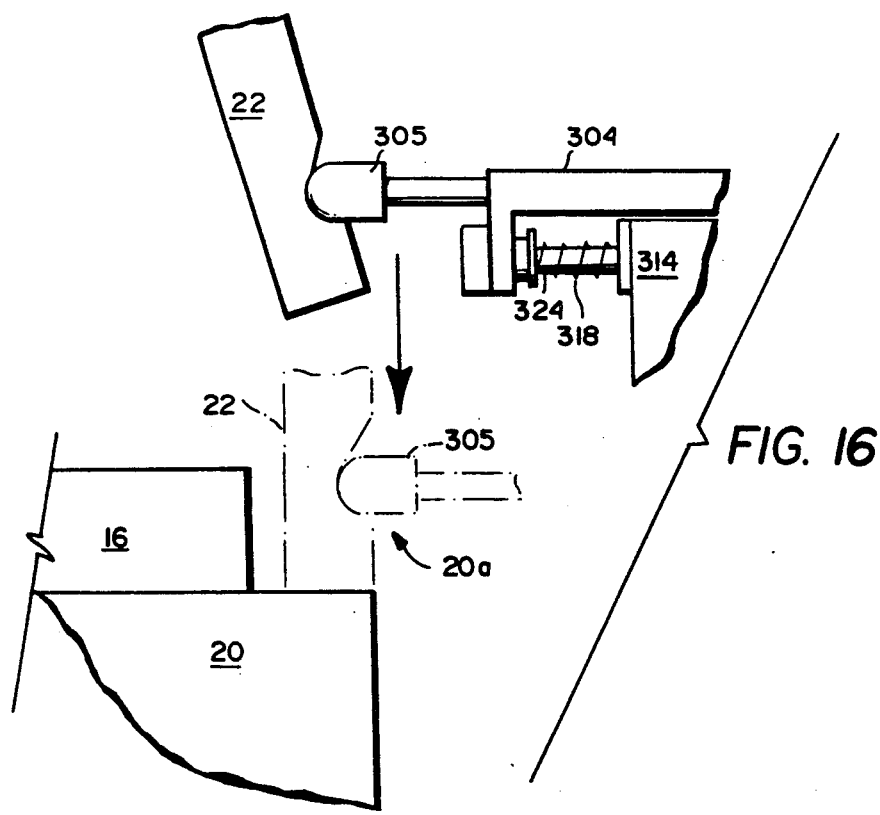
FIG. 16 shows schematically the physical interaction between the push rod and a moveable door associated with the cassette drive.
Figure 14:
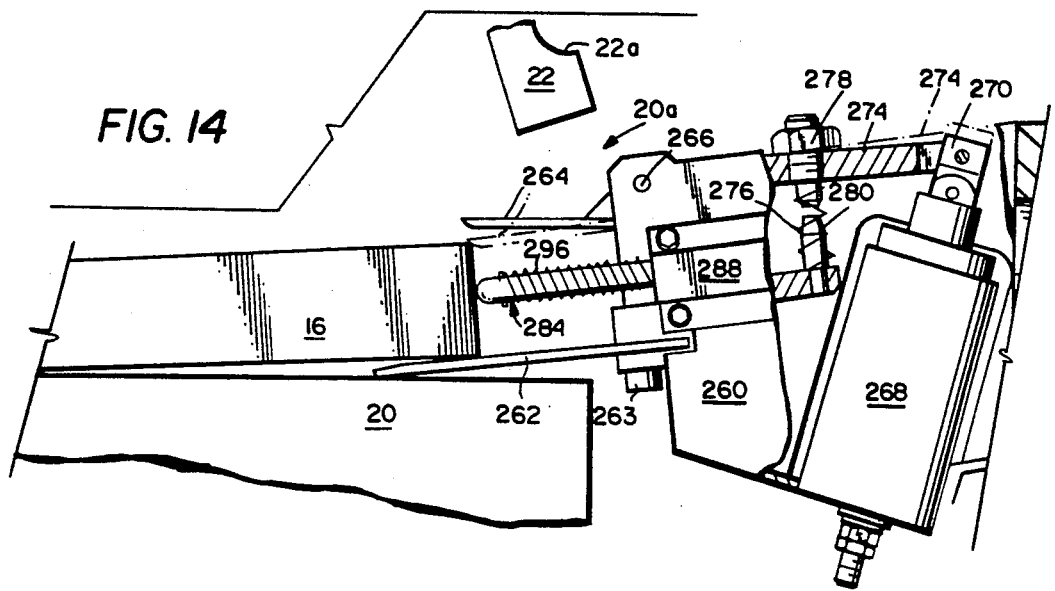

The robot manipulator 12 may then be moved so that the push rod 305 is brought into engagement with the recess surface 22a of the door 22 (as is shown by solid line in FIG. 16). By then moving the entire robot manipulator 12 downwardly (in the direction of the arrow in FIG. 16, the door 22 of the drive unit 20 may be closed.

It should be noted here that any positional inaccuracy between the push rod 305 and the door 22 is absorbed by virtue of the slideable mounting of the manipulator rod 305 in the upper support plate 304 and by virtue of the compression spring 318 acting on the push rod 305.

As will now undoubtedly be appreciated, the present invention provides a novel robotics system which is capable of operating in a variety of environments, and is especially adapted for archiving and retrieving computer data storage cassettes and operatively inserting the same within cassette drive units. Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for transporting a data storage cassette for a computer between a cassette library which stores a number of said data storage cassettes in generally a vertical orientation, and a cassette drive which includes an input slot oriented generally horizontally, said method comprising the steps of:
   (a) positioning a robotic manipulator having at least five computer controlled axes of movement for positioning a gripping apparatus, at least four axes of said five axes being rotary axes, one of said rotary axes being oriented vertically and another of said rotary axes connecting said gripping apparatus with said robot manipulator; said gripping apparatus adapted to grip the cassette therebetween such that said gripping apparatus is oriented generally vertically, and then moving said gripping apparatus so as to grip a preselected cassette stored in said cassette library;
   (b) removing said cassette from said cassette library and then repositioning said gripping apparatus so that the cassette is oriented generally horizontally;
   (c) moving the cassette into alignment with the generally horizontal input slot of said cassette drive;
   (d) ejecting said cassette into said input slot of said cassette drive so that the cassette is physically located therewithin; and then
   (e) operatively seating the cassette within the cassette drive by moving the cassette into a final operative position in with said cassette drive.

2. A method as in claim 1, further comprising:
   (a) a track on a ground surface, said track defining a path between said cassette library and said drive units, said track comprising two parallel track members which are arranged adjacent both said drive unit, and said cassette library extending in said longitudinal direction thereof;
   (b) a carriage assembly for reciprocal rectilinear movements between the cassette library and said drive units, said carriage assembly being supported by said track members, said carriage assembly being driven by a suitable reversible electric motor driving a pinion gear and being arranged on said carriage assembly, said pinion gear meshing with a gear rack associated with said track and further wherein said robot manipulator is mounted on said carriage assembly.

3. A method as in claim 1, in which said robot manipulator has six computer controlled axes of movement.

4. A method as in claim 1, wherein said step of ejecting said cassette includes contacting said cassette with an ejector, and spring-biasing said ejector so that said cassette is forcibly moved into said input slot by said ejector when said cassette is released by said gripping apparatus.

5. A method of transporting a data storage cassette from a cassette library station to a cassette drive unit and for inserting said data storage cassette into an input slot of said cassette drive unit to allow said cassette to then be operatively seated therewithin, said method comprising the steps of:
   (a) positioning a robotic manipulator having at least five computer controlled axes of movement for positioning a pair of gripping fingers adjacent a preselected cassette stored in said cassette library station, at least four axes of said five axes being rotary axes, one of said rotary axes being oriented vertically and another of said rotary axes connecting said gripping apparatus with said robot manipulator, and operating said robotic manipulator so that said preselected cassette is gripped thereby and removed from said cassette library station;
   (b) moving the robotic manipulator such that said gripped cassette is transported to a cassette drive unit spaced from said cassette library station and such that the gripped cassette is aligned with said input slot of said cassette drive unit;
   (c) ejecting said cassette from said robotic manipulator and into said input slot of said cassette drive unit by moving an ejector of said robotic manipulator relative to said gripping fingers subsequent to alignment of said cassette relative to said input slot, and then
   (d) moving said cassette into a seated operative position within said cassette drive unit.

6. A method as in claim 5, further comprising:
   (a) a track on a ground surface, said track defining a path between said cassette library and said drive units, said track comprising two parallel track members which are arranged adjacent both said drive unit, and said cassette library extending in said longitudinal direction thereof;
   (b) a carriage assembly for reciprocal rectilinear movements between the cassette library and said drive units, said carriage assembly being supported by said track members, said carriage assembly being driven by a suitable reversible electric motor driving a pinion gear and being arranged on said carriage assembly, said pinion gear meshing with a gear rack associated with said track and further wherein said robot manipulator is mounted on said carriage assembly.

7. A method as in claim 5, in which said robot manipulator has six computer controlled axes of movement.

8. A method as in claim 5, wherein said step of ejecting said cassette includes contacting said cassette with an ejector, and spring-biasing said ejector so that said cassette is forcibly moved into said input slot by said ejector when said cassette is released by said gripping apparatus.

9. A method for transporting a data storage cassette for a computer between a cassette library which stores a number of said data storage cassettes during periods of nonuse in generally a vertical orientation within horizontal rows extending in a longitudinal direction, and a cassette drive unit which includes an input slot oriented to accept a data storage cassette in generally horizontal orientation, said cassette drive unit being associated with a computer system, said method using a transport system comprising:

(a) a track on a ground surface, said track defining a path between said cassette library and said drive units, said track comprising two parallel track members which are arranged adjacent both said drive unit, and said cassette library extending in said longitudinal direction thereof;

(b) a carriage assembly for reciprocal rectilinear movements between the cassette library and said drive units, said carriage assembly being supported by said track members, said carriage assembly being driven by a suitable reversible electric motor driving a pinion gear and being arranged on said carriage assembly, said pinion gear meshing with a gear rack associated with said track;

(c) a handling system for positioning a manipulator hand, said handling system being mounted on said carriage assembly, said handling system having at least six computer controlled axes of movement for positioning said manipulator hand, at least four axes of said six axes being rotary axes, one of said rotary axes being oriented vertical with respect to said carriage assembly and another of said rotary axes connecting said manipulator hand with said handling system;

(d) said manipulator hand comprising gripping means for gripping a preselected cassette, said gripping means including a housing, and a pair of separated fingers establishing a space therebetween mounted to said housing, at least one of said fingers being movable relative to the other of said fingers so as to effect a gripping and releasing movement, wherein said method comprises the steps of:

controlling said rectilinear movements of said carriage assembly along said track and said at least six computer controlled axes of movement of said handling system such that said fingers are oriented generally vertically for gripping a preselected cassette stored in said row of said cassette library;

controlling said at least six computer controlled axes of movement of said handling system and said fingers such that (i) said cassette in said row of said cassette library enters said space between said fingers, (ii) said fingers grip said cassette in said row of said cassette library and (iii) said fingers remove said gripped cassette from said row of said cassette library;

controlling said rectilinear movements of said carriage assembly and said at least six computer controlled axes of movement of said handling system such that said gripped cassette is moved into alignment with said horizontal input slot of said cassette drive unit ; and controlling said at least six computer controlled axes and said fingers such that said gripped cassette is inserted in said input slot when released by said fingers to leave said space and enter a defined operative position within said cassette drive.

10. Method according to claim 9, including releasing and moving said cassette into said defined position within said cassette drive after said cassette has been aligned with said input slot.

11. Method according to claim 9, including ejecting said cassette from said space between said fingers by an ejector after said cassette has been aligned with said input slot.

12. Method according to claim 11, wherein said step of ejecting said cassette includes moving said ejector in said space.

13. A method as in claim 9, wherein said cassette is inserted in said input slot by a spring-biased ejector.

14. A method for transporting a data storage cassette for a computer between a cassette library which stores a number of said data storage cassettes during periods of nonuse in generally a vertical orientation within horizontal rows extending in a longitudinal direction, and a cassette drive unit which includes an input slot oriented to accept a data storage cassette in generally horizontal orientation, said cassette drive unit being associated with a computer system, said method using a transport system comprising:

(i) a track establishing a path between said cassette library and said drive unit, said track comprising two parallel track members which are arranged adjacent both said drive unit, and said cassette library extending in said longitudinal direction thereof;

(ii) a carriage operatively coupled to said track for movements along said established path between said cassette library and said drive unit;

(iii) a robot carried by said carriage for movements therewith;

(iv) a gripping apparatus carried by said robot for being moved therewith relative to said carriage, said gripping apparatus including a pair of fingers which extend from a base of said gripping apparatus and collectively establish a space therebetween for receiving said data storage cassette for transport, at least one of said fingers being movable relative to the other of said fingers so as to effect gripping and releasing movements;

(v) said robot having at least five computer controlled axes of movement for positioning said gripping apparatus, at least four axes of said five axes being rotary axes, one of said rotary axes being oriented vertical with respect to said track and another rotary axis connecting said gripping apparatus with said robot;

wherein said method comprises the steps of:

(a) positioning said robot adjacent said cassette library by movement of said robot by said carriage;

(b) moving said gripping apparatus such that said fingers are oriented generally vertically and gripping a preselected cassette in said cassette library by accepting said cassette within said space;

(c) positioning said robot adjacent said drive unit by movement of said robot by said carriage;

(d) moving said gripping apparatus such that said fingers are oriented generally horizontally and in alignment with said input slot of said cassette drive unit; and (e) inserting said cassette into said input slot by advancing said gripping apparatus towards said input slot.

15. Method to claim 14, including pushing said cassette into said input slot.

16. Method according to claim 14, including ejecting said cassette from said space.

17. Method according to claim 14, including releasing said cassette from said gripping fingers when said cassette is introduced into said input slot by moving an upper one of the finger members relative to a lower one of said finger members which is immovably connected to a housing of said gripping means.

18. A method as in claim 4, in which said robot manipulator has six computer controlled axes of movement.

19. A method for transporting a data storage cassette for a computer between a cassette library which stores a number of said data storage cassettes during periods of nonuse in generally a vertical orientation within horizontal rows extending in a longitudinal direction, and a cassette drive unit which includes an input slot oriented to accept a data storage cassette in generally horizontal orientation, said cassette drive unit being associated with a computer system, said method using a transport system comprising:
(i) a track establishing a path between said cassette library and said drive unit, said track comprising two parallel track members which are arranged adjacent both said drive unit, and said cassette library extending in said longitudinal direction thereof;
(ii) a carriage operatively coupled to said track for movements along said established path between said cassette library and said drive unit;
(iii) a robot carried by said carriage for movements therewith;
(iv) a gripping apparatus carried by said robot for being moved therewith relative to said carriage, said gripping apparatus including a pair of fingers which extend from a base of said gripping apparatus and collectively establish a space therebetween for receiving said data storage cassette for transport, at least one of said fingers being movable relative to the other of said fingers so as to effect gripping and releasing movements;
(v) said robot having at least five computer controlled axes of movement for positioning said gripping apparatus, at least four axes of said five axes being rotary axes, one of said rotary axes being oriented vertical with respect to said track and another rotary axis connecting said gripping apparatus with said robot;

wherein said method comprises the steps of:
(a) positioning said robot adjacent said cassette library by movement of said robot by said carriage;
(b) moving said gripping such that said fingers are oriented generally vertically and gripping a preselected cassette in said cassette library by accepting said cassette within said space;
(c) positioning said robot adjacent said drive unit by movement of said robot by said carriage;

(d) moving said gripping apparatus such that said gripping fingers are oriented generally horizontally and in alignment with said input slot of said cassette drive unit; and (e) inserting said cassette into said input slot by ejecting said cassette from said space after said cassette is released by said finger members.

20. Method according to claim 19, including ejecting said cassette after said cassette is released by said finger members.

21. A method as in claim 19, in which said robot manipulator has six computer controlled axes of movement.

22. A method for transporting a data storage cassette for a computer between
a cassette library which stores a number of said data storage cassettes during periods of nonuse in generally a vertical orientation within horizontal rows extending in a longitudinal direction, and
a cassette drive unit which includes an input slot oriented to accept a data storage cassette in generally horizontal orientation, said cassette drive unit being associated with a computer system, said method using a transport system comprising:
(a) a track on a ground surface, said track defining a path between said cassette library and said drive units, said track comprising two parallel track members which are arranged adjacent both said drive unit, and said cassette library extending in said longitudinal direction thereof;
(b) a carriage assembly for reciprocal rectilinear movements between the cassette library and said drive units, said carriage assembly being supported by said track members, said carriage assembly being driven by a suitable reversible electric motor driving a pinion gear and being arranged on said carriage assembly, said pinion gear meshing with a gear rack associated with said track;
(c) a handling system for positioning a manipulator hand, said handling system being mounted on said carriage assembly, said handling system having at least six computer controlled axes of movement for positioning said manipulator hand, one of said axes being rotary and oriented vertical with respect to said carriage assembly and another of said axes being rotary and connecting said manipulator hand with said handling system;
(d) said manipulator hand comprising a housing, and a pair of separated gripping fingers establishing a space therebetween mounted to said housing, at least one of said gripping fingers being movable relative to the other of said gripping fingers so as to effect gripping and releasing movements of said manipulator hand; wherein said method comprises the steps of:
controlling said rectilinear movements of said carriage assembly along said track and said at least six computer controlled axes of movement of said handling system such that said gripping fingers are oriented generally vertically for gripping a preselected cassette stored in said row of said cassette library;
controlling said at least six computer controlled axes of movement of said handling system and said gripping fingers such that (i) said cassette enters said space between said gripping fingers, (ii) said gripping fingers grip said cassette in said row of said cassette library, and (iii) said gripping fingers remove said gripped cassette from said row of said cassette library;

controlling said rectilinear movements of said carriage assembly and said at least six computer controlled axes of movement of said handling system such that said gripped cassette is moved into alignment with said horizontal input slot of said cassette drive unit;

controlling said at least six computer controlled axes and said gripping fingers such that said gripped cassette is released by said gripping fingers and is inserted into said input slot of said drive unit; and seating said cassette into a defined operative position within said drive unit.

23. A method as in claim 22, including moving said cassette into said defined position within said cassette drive after said cassette has been aligned with said input slot and released by said gripping fingers.

24. A method as in claim 22, including ejecting said cassette from said space between said gripping fingers by an ejector after said cassette has been aligned with said input slot.

25. A method as in claim 24, wherein ejecting said cassette includes moving said ejector in said space.

26. A method as in claim 25, wherein ejecting said cassette includes spring-biasing said ejector into contact with said cassette.

27. A method as in claim 22, wherein said housing includes an ejector which is spring-biased into an extended position in said space, and wherein said method further comprises:

retracting said spring-biased ejector in response to said cassette entering said space prior to gripping of said cassette by said gripping fingers, and moving said at least one movable gripping finger to release said cassette and to allow said ejector to be spring-biased into said extended position.

* * * * *